(12) United States Patent
Morrow et al.

(10) Patent No.: US 7,309,021 B2
(45) Date of Patent: *Dec. 18, 2007

(54) DUAL MODE CONTROLLER FOR ISO7816 AND USB ENABLED SMART CARDS

(75) Inventors: Neil Morrow, San Jose, CA (US); Hyang-Kyun Oh, Santa Clara, CA (US); Ching-Yung Han, Sunnyvale, CA (US)

(73) Assignee: O2Micro International Limited, Georgetown, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 11/612,307

(22) Filed: Dec. 18, 2006

(65) Prior Publication Data
US 2007/0084923 A1   Apr. 19, 2007

Related U.S. Application Data

(63) Continuation of application No. 11/175,102, filed on Jul. 5, 2005, now Pat. No. 7,150,397, which is a continuation of application No. 10/272,716, filed on Oct. 17, 2002, now Pat. No. 6,913,196.

(60) Provisional application No. 60/359,189, filed on Feb. 20, 2002.

(51) Int. Cl.
*G06K 19/06* (2006.01)
(52) U.S. Cl. ........................ 235/492; 235/379; 235/451
(58) Field of Classification Search ................ 235/451, 235/492, 379, 380; 714/32; 710/14, 15
See application file for complete search history.

(56) References Cited
U.S. PATENT DOCUMENTS 6,913,196 B2 * 7/2005 Morrow et al. ............. 235/451
7,150,397 B2 * 12/2006 Morrow et al. ............. 235/451

* cited by examiner

*Primary Examiner*—Steven S. Paik
(74) *Attorney, Agent, or Firm*—Grossman, Tucker, Perreault & Pfleger, PLLC

(57) ABSTRACT

A dual mode smart card controller is provided. In one embodiment, a USB and ISO7816 smart card controller is provided that determines the type of card that is inserted into a slot. If the smart card is a USB smart card, the controller is adapted to pass control of the smart card to an external PC host USB hub circuit. If the smart card is an ISO7816 card, then control is handled by the dual mode controller. In another embodiment, the controller includes an embedded USB hub circuit to permit the controller to directly control both USB and ISO7816 smart cards. Exemplary control sequencing includes monitoring a C4 signal line for a preselected time period, or generating an enable signal if a USB smart card is detected.

8 Claims, 4 Drawing Sheets

US 7,309,021 B2

DUAL MODE CONTROLLER FOR ISO7816 AND USB ENABLED SMART CARDS

CROSS REFERENCE TO RELATED APPLICATIONS

This application is a continuation of U.S. Nonprovisional application Ser. No. 11/175,102 filed Jul. 5, 2005, now U.S. Pat. No. 7,150,397, which itself is a continuation of U.S. Nonprovisional application Ser. No. 10/272,716 filed Oct. 17, 2002, now U.S. Pat. No. 6,913,196, the teachings of which are herein incorporated by reference, and also claims the benefit of U.S. Provisional Application No. 60/359,189, filed Feb. 20, 2002 the teachings of which are also hereby incorporated by reference.

FIELD OF THE INVENTION

This invention relates to the design, manufacturing, and implementation of semiconductor devices. More particularly, this invention relates to the design, manufacturing and implementation of semiconductor devices, specifically controllers that convert standard PC bus technologies to ISO7816 and other Smart Card technologies, and Smart Card readers that implement the Smart Card controllers.

DESCRIPTION OF RELATED ART

Prior Art ISO7816 Smart Card Readers

Smart Card readers are the devices that connect the Smart Card(s) to the PC. Typical implementations include a cable with a plug for USB or RS232 (Serial Port) that attaches to the PC on one end, and a plastic casing with an opening for Smart Card on the other. In the plastic case is a circuit board consisting of a semiconductor device referred to as a Smart Card controller, a connector socket for Smart Card connectivity, and miscellaneous electrical components for power control and electrical stability.

Smart Card readers may be embedded in a PC, and may attach to a non-accessible peripheral bus interface such as PCI or ISA. In this case, there are no cables, and the PC has an opening and an integrated connector socket for the Smart Card.

Prior art Smart Card readers typically support ISO7816-3 asynchronous cards, and some are enabled to support ISO7816-10 synchronous mode cards. The protocols for these two types of cards are different. However, the plug and play model for each is typically the same. When a card is inserted, the Smart Card controller is notified by the assertion of a card detection signal, for example SC_CD# (typically an active low signal). A prior art Smart Card controller will immediately notify the PC software of the insertion event by setting a status register, and possibly asserting an interrupt to the host CPU requesting service of the event.

The inserted cards are typically reset under software control, via a register interface, and reply to the reset with card configuration and capability information. Typically the hardware or software chooses to try 7816-3 asynchronous card mode first to get a response from the card, and after some number of failing attempts will try the 7816-10 synchronous card mode. If the card responds successfully to either 7816-3 or 7816-10 reset attempts, then the card type is determined and the card functions are utilized. Some 7816-10 cards utilize the C4 contact (defined as C4 in 7816-2) for the FCB signal (defined as FCB in 7816-10). The C4 contact is reserved for 7816-3 cards, and not used. Also, the C8 contact (defined as C8 in 7816-2) is reserved for both 7816-3 and 7816-10 cards, typically not used, and in some applications no contact is provided between the socket connector and Smart Card controller for C8.

The reset protocol for asynchronous Smart Cards is defined in ISO7816-3. The FCB signal defined in 7816-10 has limited timing information, and does not provide a maximum logic level high time or a minimum logic level low time.

Prior Art USB Smart Card Readers.

One of the biggest advantages of USB Smart Cards is the simplicity of the reader. With USB Smart Cards, the reader only has to provide physical connectivity between the USB signals on the PC and the USB signals on the card. This can be done without any semiconductor devices.

The literature from Gemplus and Schlumberger indicates the USB D+ and D− signals for USB Smart Cards are provided on existing C4 and C8 Smart Card contacts, as defined in 7816-2. This information is provided on the USB Smart Card technical Q&A, which states that 2 contacts at the bottom of the gold-colored module are used to support USB D+ and USB D−.

The USB Smart Cards are USB functions, and to be compatible with the USB specification must implement 1.5 kOhm R2 (per 7.1.3 USB) pull-up resistors on D+ or D− to indicate low-speed or full-speed functionality, tied to a voltage source of 3.0V-3.6V. For USB Smart Cards, this voltage source must be provided through C1 and/or C6 power supply input contacts. When the USB Smart Card is connected to a PC hub, the R2 resistor pulls-up either D+ or D− (depending upon speed), and causes a connection detect for the USB controller resident on the PC. Per the USB specification, the connection detect (called conn_det in USB Spec 11.2.3) is asserted by the USB hub port if either D+ or D− are sampled high for at least 2.5 micro-seconds.

FIG. 1 shows a conventional smart card controller enabled for both 7816-3 asynchronous and 7816-10 synchronous Smart Cards. The host bus input/output (100) interface handles the connection to a PC host bus, such as PCI, ISA, USB, 3GIO, or IEEE1394. The host bus protocol handler (101) may be a simple state machine such as PCI that directly converts cycles from the PCI bus to internal registers, or it may be more complex such as a USB bus handler that schedules packets and handles the endpoint functions defined in the USB specification. The smart card controllers typically have logic (102) used to control power to the smart card socket. Typical voltage levels are 3V and 5V, and the controller switches these levels by asserting 5V_SW# (110) and 3V_SW# (111) signals to the power switch (109). The power switch (109) may be an integrated component of the smart card controller. The smart card socket is not integrated into the controller, but input/output terminals (108) are provided to connect the smart card socket signals to the smart card controller. Signals such as power control (110, 111) and a card detection signal (112) also interface to the smart card controller through system input/output terminals (107). Insertion and removal events are provided to the smart card controller via the SC_CD# (112) card detect signal. Typically, insertion and removal events cause an interrupt, INTR (106), to the PC host system to immediately service the event. The card detect logic (103) typically sets status bits from the SC_CD# input signal, which cause the INTR (106) assertion. Often, the smart card controller includes de-bounce logic in the card detect logic block (103) since the mechanical connection is typically not instantaneous.

Smart card controllers usually support ISO7816-3 cards, and include control logic (104) specific for the asynchronous mode of operation. The 7816-3 cards use C2, C3, and C7 contacts defined in ISO7816-2 for the RST, CLK, and I/O signals (defined in ISO7816-3). Some smart card controllers also support the ISO7816-10 cards, and include control logic (105) to support the synchronous mode of operation. The 7816-10 cards use C2, C3, C7, and additionally C4 contacts defined in ISO7816-2 for the RST, CLK, I/O, and FCB signals (defined in ISO7816-10). The C2, C3, C7, and C4 contact signals are input to the smart card controller through the smart card input/output terminals (108). Typical smart card controllers also include an input for C8 contact signal, although it is reserved for future use in both 7816-3 and 7816-10. The C1, C5, and C6 smart card contacts are used for power and ground, and may be directly input to the smart card controller to power the inputs and outputs. Smart card controller terminals may also source C1, C5, and C6 if the power switch (109) is integrated.

SUMMARY OF THE INVENTION

Gemplus and Schlumberger announced USB enabled Smart Cards, and indicates the signals that USB is connected to the card. There are two significant advantages to USB Smart Cards: they have higher bandwidth than existing ISO7816 cards, and a simple connector with no electronics can make the simple connection to a USB-enabled PC.

Although there may be a time when only USB Smart Cards exist, there will be an interim period that both existing ISO 7816 and new USB Smart Cards exist on the market. During that time, a "dual mode reader" that supports both existing ISO7816 and USB Smart Cards will be valuable. One goal of this invention is to make possible this dual mode reader, which implements a special Smart Card controller semiconductor device.

Per the USB Specification, the USB Smart Card must implement 1.5 kOhm R2 (per 7.1.3 USB) pull-up resistors on D+ or D− to indicate low-speed or full-speed functionality. The dual-mode smart card controller can sample the D+ and D− connector signals (C4 and C8) to determine if a USB smart card is inserted. First it must power the socket. Normally, the smart card PC sub-system powers the smart card socket, so new circuitry is added to automatically power the socket to determine if C4 or C8 are pulled-up to the applied voltage, indicating the presence of a USB smart card.

During the sensing period described above, the smart card detection needs to be masked from the existing smart card sub-system. Normally, an interrupt is provided to the host that a card has been inserted. Whatever the mechanism is to notify the host of insertion events, it may be masked until the sensing is complete. If a USB smart card is detected, then the existing (legacy) smart card sub-system shall not be made aware of the insertion event. The USB sub-system will detect the card insertion after 2.5 us after power is applied (per the conn_det specifications in 11.2.3 of the USB Rev 1.0 specification).

In one embodiment, it is envisioned that the power automatically applied to the Smart Card during the sensing period will continue to be applied directly if a USB smart card is determined. If a non-USB smart card is sensed, then the power will be removed, since existing smart card sub-systems automatically apply power.

In a PCI-based motherboard embodiment, it is envision the USB signals routed directly from the USB smart card connector to the PC resident USB host (upstream) port, and also to the smart card controller. Filter logic on the C4 signal is provided to ensure C4 is not asserted by the smart card controller for more than 2.5 us when a non-USB card (for example, a 7816-10 card) is operating. If C4 were asserted more than 2.5 us, then the upstream USB hub would make a false determination of conn_det (that a USB device was inserted). Similar logic is added to C8 for any protocols other than 7816-10 or 7816-3. For example, in a vendor-specific turbo-mode that utilized C8 (or C4) for higher bandwidths. There are advantages to this embodiment in that little circuitry needs to be added to the dual-mode smart card controller. If the C4 filter was not included, then the smart card controller could not support 7816-10 cards or any other modes that utilize C4 and C8.

USB-based embodiments may include an integrated USB hub port to support the USB smart cards. In these embodiments, the C4 filter may not be necessary because a port-enable signal will be included that switches on the new port when a USB smart card is detected. When the port-enable signal is not asserted (e.g. a non-USB card is inserted, or no smart card is inserted), the new USB port is disabled and does not sample D+ and D− for the 2.5 us conn_det event.

Most USB smart cards will also support ISO7816 mode, since the USB readers are not as prevalent. There may be applications, such as banking applications, that require 5V ISO7816-3 mode, but the system is also capable of supporting USB Smart Card for other applications. The dual mode smart card controller may be aware that the 7816 mode has priority, and skip the identification methods above.

For the case where D+ and D− USB smart card signals are routed directly from the USB smart card connector to the PC resident USB host (upstream) port, and also to the smart card controller, the dual-mode controller shall drive the C4 and C8 terminals to a logic level low to prevent the USB sub-system from determining a USB Smart Card is inserted. By driving C4 and C8 low, the D+ and D− signals are not asserted to the host USB port, and no conn_det (connection detection) event occurs.

For the case where the dual-mode controller includes an integrated hub, the port-enable signal may be deasserted when the ISO7816 operating mode is preferred over the USB smart card mode. In this case, it is not necessary to drive C4 and C8 since the deasserted port-enable signal assures notification is not given to the USB host.

DETAILED DESCRIPTION OF EXEMPLARY EMBODIMENTS

Figure 1:
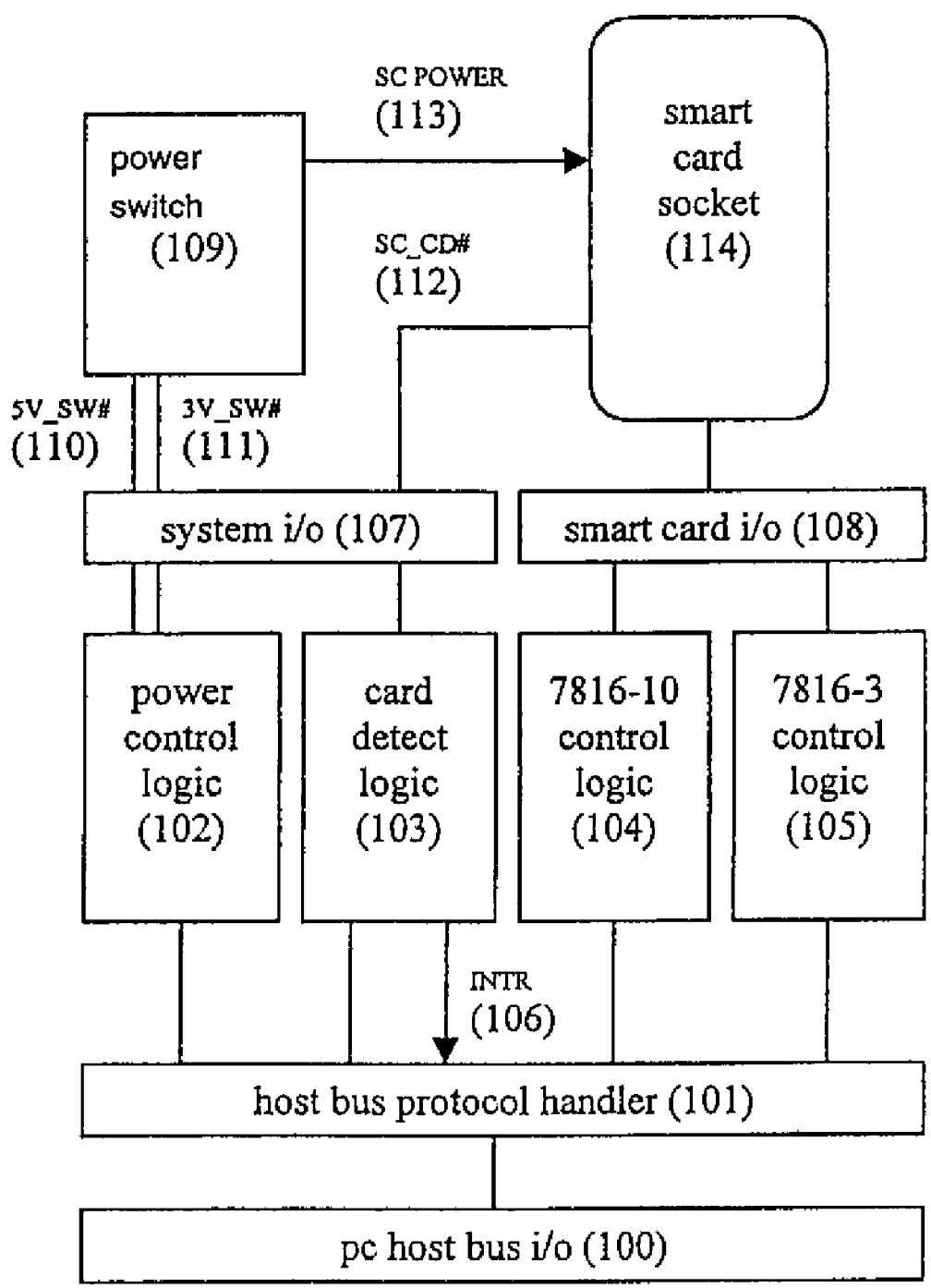
FIG. 1 depicts a block diagram of a conventional ISO7816 smart card controller.
Figure 2:
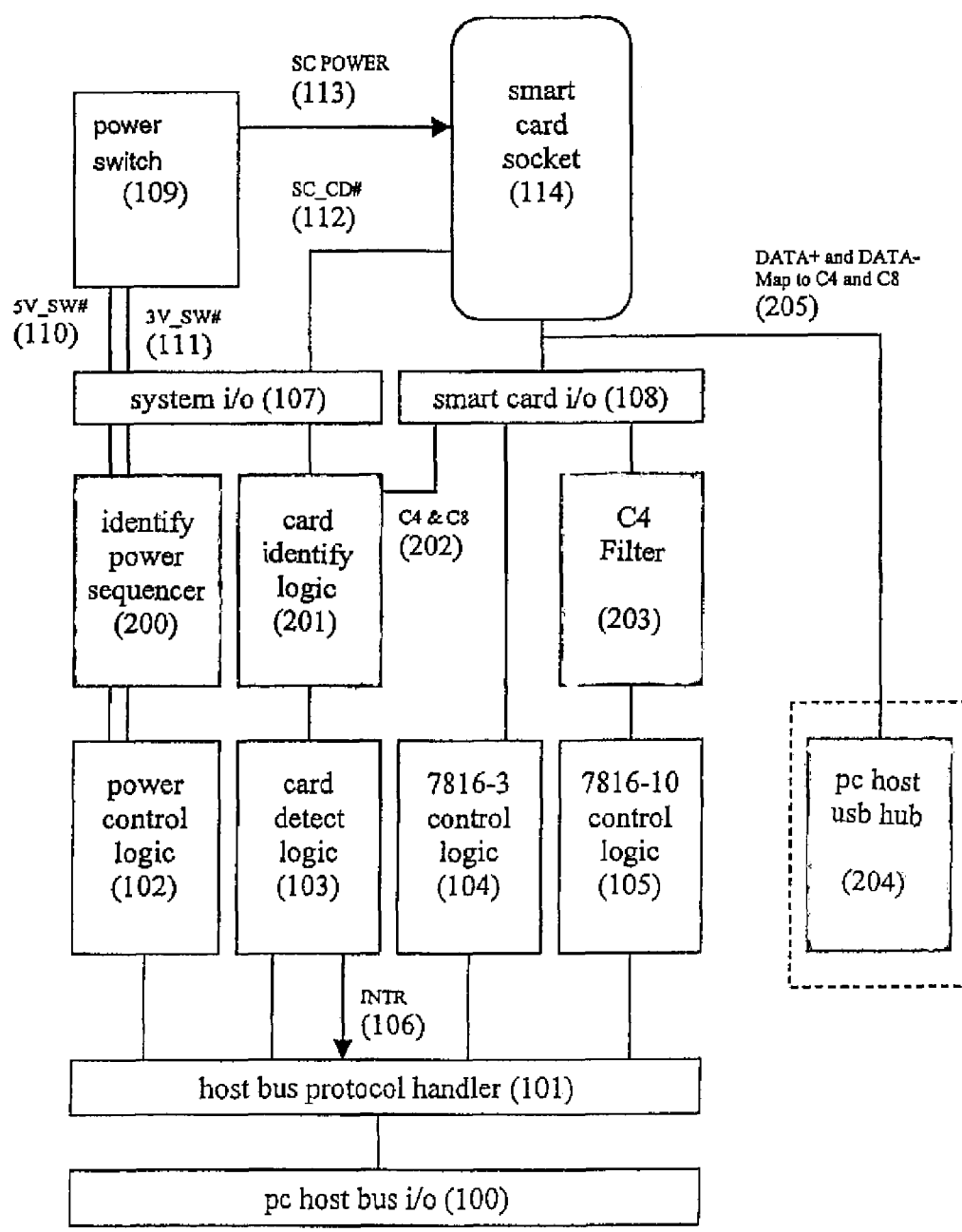
FIG. 2 is an exemplary block diagram of a dual mode smart card controller of the present invention.

FIG. 2 is an exemplary dual mode smart card controller. In this exemplary embodiment, the conventional smart card controller of FIG. 1 is modified to include an identification power sequencer (200), card identify logic (201), and a C4 filter (203) to support routing USB signals DATA+ and DATA– directly to a smart card socket (114) from a PC host USB hub port (204). In general, the power sequencer 200 and card identify logic 201 may include state machine logic that generates an appropriate output based on the inputs provided. The C4 filter 203 may include a digital filter that samples the signal represented at the C4 pin position to determine how long the C4 signal is logic high. Of course, this implementation is only exemplary. Those skilled in the art will recognize that the functionality associated with components 200, 201 and 203 may be implemented using a variety of custom and/or off-the-shelf circuitry, and all such alternatives are deemed within the spirit and scope of the present invention.

The card identify logic (201) is provided to poll C4 & C8 (202) signals to determine if a USB smart card is inserted, and to mask the notification of the card insertion to the card detect logic 103 of the conventional smart card controller. Thus, no INTR is signaled to the smart card sub-system during insertion or removals of USB Smart Cards. When the identify logic (201) determines an ISO7816 smart card is inserted, the power used for identification is removed by the power sequencer (200), and the power will be re-applied by typical means after the card insertion notification is provided, perhaps by the INTR (106) interrupt. If a 7816-10 card utilizing C4 is inserted, the C4 filter (203) assures that the C4 signal is not asserted for more than 2.5 us, to assure that the PC host USB hub (204) port does not get a false connection detect (i.e. conn_det per USB specification). The USB hub 204, in this exemplary embodiment represents the upstream connection to the root USB hub (although other USB hubs may be present along the path to the smart card socket 114). In the case where an application prefers the ISO7816 mode when a smart card supports both ISO7816 and USB mode, the C4 and C8 signals (202) can be driven to logic level low (perhaps by the card identify logic, 201) by the dual-mode smart card controller to mask the USB smart card capability from the USB host.

Figure 3:
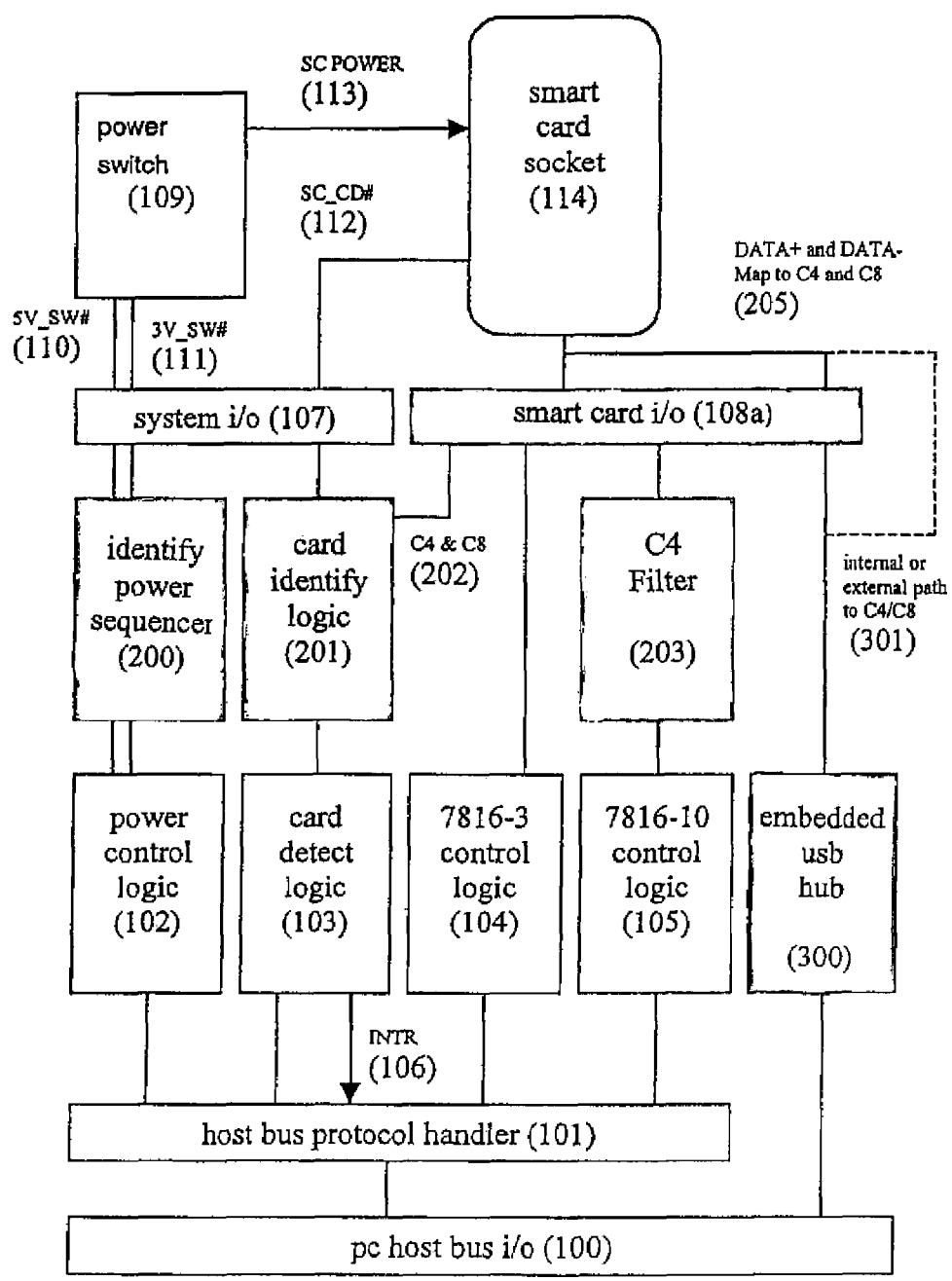
FIG. 3 is another exemplary block diagram of a dual mode smart card controller of the present invention.

FIG. 3 illustrates another exemplary dual mode smart card controller. In this embodiment, a USB hub (300) is embedded into the smart card controller to support USB smart cards. The illustrated configuration requires the identification and power sequencer elements (200 and 201) to determine the card type, as well as the C4 filter (203) to assure that the integrated USB hub port does not get a false connection detect, as described above. In this configuration, the embedded USB hub may be a USB host controller root-hub (perhaps residing on a PCI host bus), or a downstream USB hub with an upstream port, either via a USB PC host bus (100) or through additional terminals providing the upstream port connection. The option is illustrated by (301) in FIG. 3. In either case, the downstream port connection to the USB smart cards can be routed externally on additional terminals or directly to the C4/C8 signals through a modified smart card i/o block (108a) that supports this connection. I/O block 108a is appropriately modified with USB specification transceivers to permit USB communication directly between the embedded hub 300 and the smart card.

Figure 4:
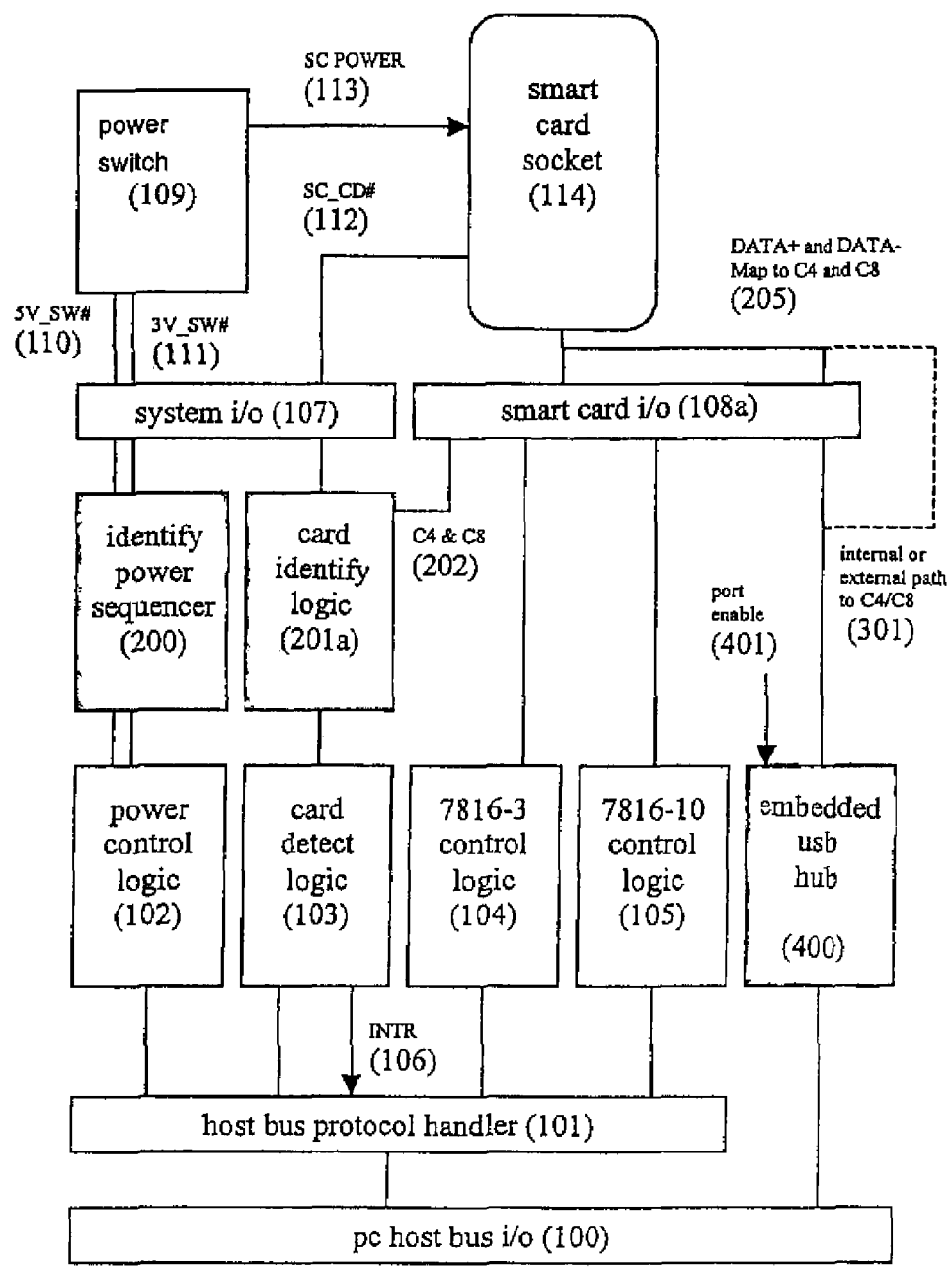
FIG. 4 is another exemplary block diagram of a dual mode smart card controller of the present invention.

FIG. 4 illustrates embedding a USB hub (400) directly into the smart card controller to support the USB smart cards, identical to the hub (300) in FIG. 3, with a port enable/disable signal (401). With a port enable/disable signal (401), the C4 filter can be removed, because a disabled USB port will disable the detection circuitry. Thus, if the C4 signal is asserted for more than 2.5 us during ISO7816-10 operation, the USB host will not be notified if the port is disabled. The port enable signal (401) can be asserted by the card identify logic (201a) when a USB card is detected, otherwise the embedded USB port is disabled. In the case where an application prefers the ISO7816 mode when a smart card supports both ISO7816 and USB mode, the port-enable signal (401) may be deasserted to enable the ISO7816 mode and mask the USB smart card capability from the USB host.

What is claimed is:

1. A smart card controller, comprising
   USB card identify logic configured to poll C4 and C8 signals, defined by the USB specification, to determine if an ISO7816 smart card or a USB smart card is inserted into a socket, said USB card identify logic is further configured to mask the presence of a USB smart card from ISO7816 card detect logic and generate a port enable/disable signal; and
   a USB hub circuit embedded directly into said smart card controller and configured to provide input and output commands to said USB smart card, wherein said USB hub circuit is configured to receive said port enable/disable signal from said card identify logic.

2. A smart card controller as claimed in claim 1, further comprising a PC host bus I/O controller coupled to a host bus protocol handler for exchanging commands and data between said USB card identify logic and a PC host bus.

3. A smart card controller as claimed in claim 1, further comprising identify power sequencer circuitry configured to provide power to a smart card for a predetermined time period, and if said smart card is a USB smart card to discontinue power to said USB smart card after said predetermined time period.

4. A smart card controller as claimed in claim 1, further comprising power switch circuitry configured to couple power to said ISO7816 or said USB smart card.

5. A smart card controller as claimed in claim 1, further comprising a host bus protocol handler coupled to an ISO7816 smart card control logic, an ISO7816 card detect logic and an ISO7816 power control logic, said host protocol handler is capable of generating PC host bus communication signals.

6. A smart card controller as claimed in claim 1, wherein if said C4 signal line is logic high for less than a predetermined time period then control of said smart card is passed to an ISO7816 control logic.

7. A smart card controller as claimed in claim 6, wherein said time period is approximately 2.5 micro-seconds.

8. A smart card controller as claimed in claim 1, wherein if said smart card supports both ISO7816 and USB protocols, said card identify logic is further configured to drive said C4 and C8 signals to a logic low level to permit said smart card to operate as an ISO7816 smart card.

* * * * *